Dec. 24, 1940. W. J. MILLER Re. 21,672
METHOD AND MEANS FOR AUTOMATICALLY FEEDING AND FORMING PLASTIC MATERIAL IN THE MANUFACTURE OF POTTERY
Original Filed Jan. 5, 1927
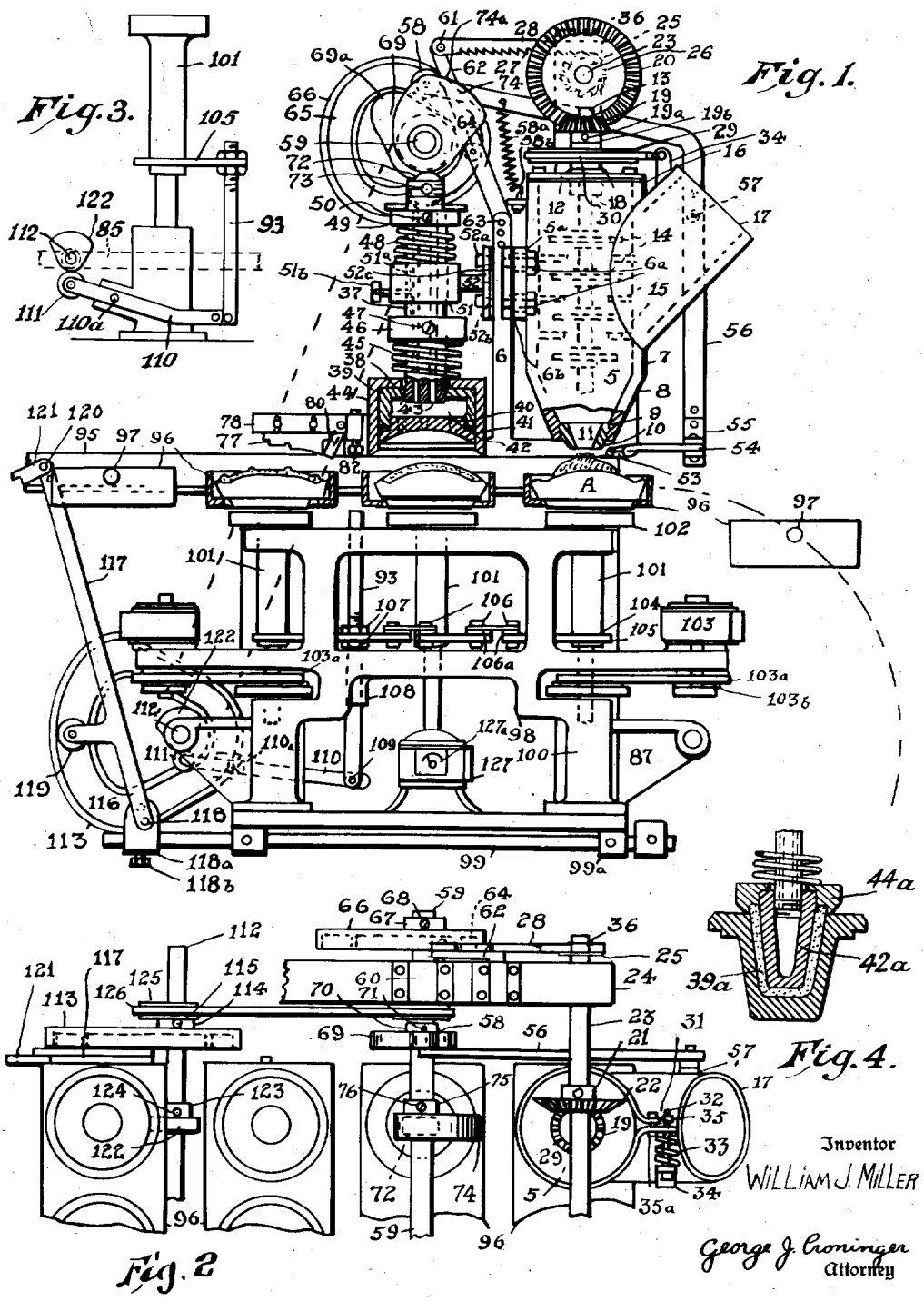

Reissued Dec. 24, 1940 Re. 21,672

UNITED STATES PATENT OFFICE 21,672

METHOD AND MEANS FOR AUTOMATICALLY FEEDING AND FORMING PLASTIC MATERIAL IN THE MANUFACTURE OF POTTERY

William J. Miller, Swissvale, Pa.

Original No. 1,769,528, dated July 1, 1930, Serial No. 159,153, January 5, 1927. Application for reissue March 26, 1937, Serial No. 133,164

17 Claims. (Cl. 25—22)

This invention relates to an improved method and means for automatically feeding and forming plastic material in the manufacture of pottery.

This application is a division of my co-pending application Serial No. 32,753, filed July 18, 1935, for the reissue of my United States Letters Patent No. 1,769,528 and relates specifically to a method and means for applying plastic material to molds in the manufacture of pottery.

According to the manual system of ware fabrication on a potter's wheel, the batter out pinches off gobs of plastic clay at random, from a slug, flattens the same into the form of a "pancake" of a diameter insuring complete coverage of the ware forming surface of a mold when applied thereto; and then deposits the same on a mold the clay sticking thereto due to its adhesive nature, after which the potter jiggers the clay and sets the mold aside for subsequent transportation by a mold runner to the stove room. Air entrapment between the pancake and mold often occurs preventing the establishment of a complete and perfect state of capillarity over the engaging surfaces of clay and mold so necessary to promote proper drying. The clay normally adheres to the mold, but often creeps or slips under the drag of the profile tool due to insufficient bonding.

In the production of flat and hollow ware, as heretofore manually practiced, an attendant segregates gobs of clay from a conditioned mass and throws the same into the bottom of the hollow mold without batting the same out or further processing it. The mold is spun on the potter's wheel at a relatively high R. P. M. and upon introduction of the jiggering tool, the clay is spread through the combined action of the tool and centrifugal force. The inherent stickiness of the clay causes it to cling to the sides of the mold and establish a mechanical bond of problematical efficiency but sufficient to promote the capillary absorption of shrinkage water by the mold. The jiggering tool distributes the clay over the molding surface and tends to throw it outwardly and upwardly toward the brim where the excess is removed by the potter.

In the production of ware of this class according to the present invention, molds are automatically charged with clay, each charge being of substantially equal volume and with a minimum of excess material. This charge is pressed in the mold by a die which spreads the clay quickly and evenly over the surface of the mold and affixes it thereto, the efficiency of the bonding being increased by virtue of the pressure applied. This insures a firm mechanical bond between the clay and mold not impaired by entrapped air and a bond which promotes the equal absorption of shrinkage water by the mold. This step of pressing out the clay in the mold after charging and before jiggering is novel to the production of ware of this class in absorbent molds and when the clay is jiggered, the tendency of the bat to slip is minimized and because of a minimum of clay in the bat the amount of excess requiring removal is reduced and hence the time required to remove it. This contributes to accelerating the jiggering operation and promotes the higher production speeds contemplated with apparatus of this nature.

The present method, in more general terms, consists in covering a portion of the ware forming surface of a mold with clay in an amount, at least sufficient to form a ware body, then spreading the clay over the ware forming surface by pressing, as with a die to flow the clay towards the periphery of the mold, preferably in all directions simultaneously to completely cover the total area of the ware forming surface and adhesively bond the clay to the mold surface and then smoothing the surface of the clay as by jiggering with a profile tool. The radial progressive spreading action of the clay from the central zone of the mold toward the periphery prevents air entrapment common to manual bat application and at the same time the clay is adhesively bonded to the mold by the pressure required to spread, setting up a bond of greater efficiency and one not liable to allow slippage of the clay on the mold and one that will maintain the bond unimpaired when under the profile tool.

Means are also provided in the present instance for rotating and raising and lowering any one or all of the chucks independently or as a unit, to similarly raise and lower and rotate the mold in timed relation to the preforming means, while the charge is being subjected to either of the foregoing operations.

Fig. 1 is a side elevation, partly in section, of a preferred form of mechanism for carrying out my improved method.

Fig. 2 is a top plan view of a part of the mechanism.

Fig. 3 is an elevation of a chuck assembly.

Fig. 4 is a transverse vertical sectional view of a press or preforming assembly which may be used for deep molds.

The ware manufactured is known in the art as "jiggered dinnerware" as distinguished from the coarser clay ware arts and is plastic, normally adhesive and is fabricated on absorbent molds to which the clay is bonded and adhesively "stuck" so thoroughly that the clay and mold may rotate as a unit, the bond being also so thorough that a state of capillarity is established and maintained during the removal of excess material and thereafter as the ware dries. The ware eventually becomes sufficiently dehydrated through the abstraction of moisture by the mold to shrink and release therefrom. Clay from which jiggered potteryware is made is normally soft and plastic and being inherently sticky it has a great affinity for porous plaster molds and adheres thereto with greater tenacity than to a metal surface. Pressing, as taught herein, improves the bond between the clay and the plaster mold and imparts to the surface in engagement with the mold a greater smoothness, thus making it easier to finish the ware, besides increasing the density through a closer compacting of the grain structure, thereby adding to the strength of the product.

The numeral 5 designates a container, preferably of cylindrical form, which may be formed with a flanged bracket 5a at one side thereof for adjustable securement to a part of the frame, generally indicated at 6, as by screws 6a and shims 6b. The clay is fed to the molds by virtue of this apparatus as disclosed in my co-pending application Serial No. 32,753, the feeder being arranged to deposit and segregate a gob of clay on the mold.

Mounted in transverse alignment relatively to the extruding mechanism are means for shaping or preshaping the plastic charge by pressing the same against the mold which firmly secures the charge thereto whilst spreading the charge from its central position radially over the total ware forming surface of the mold, the mold and die forming in effect a molding chamber when in cooperation, substantially closed by ring 44 as hereinafter described and conforms the charge to the shape of the mold and under a pressure that is substantially equally distributed over the clay, preferably comprising in the present instance a cylindrical plunger 37 having screw-threads 38 formed on its lower extremity, for removable and adjustable application of an annular press head or member 39, as shown in section in Fig. 1, also having lower inner screw threads 40, for removable and adjustable application of an annular press plate 41 having a suitably shaped lower surface or face, a chamber being formed above this press plate, as at 42. This chamber may have introduced therein and circulated therethrough various mediums such as hot or cold air, water, oil or other fluid or heating, cooling or lubricating mediums, and likewise, the press plate 41 may be formed of any suitable material and manner, as for instance porous, or have openings therein, so that the fluid or other medium may saturate or exude onto the plastic charge. To enable introduction and circulation of such medium as may be desired, I prefer to form the plunger with longitudinal bores 43 leading into said chamber and suitable flexible conveying members may be connected with these bores at the upper extremity of the plunger. One advantage of the chamber 42 is that by introduction of a suitable fluid or lubricating medium the charge will more easily separate from the press plate or will not adhere thereto when the latter is raised, thus insuring retention of the clay on the mold and preventing any tendency toward rupture of the firm bond established. It may also be desirable, in some instances, to inject into the chamber 42 a fluid or mixture which will enhance the finish of the article of pottery or even a coloring fluid, the many advantages appertaining to this chamber being obvious to those skilled in the art.

Slidably mounted and rotatable on the lower extremity of the plunger 37 over the press head 39 and plate 41 is a charge-confining member in the form of an annular ring or sleeve 44 of suitable shape, preferably of the form shown in section in Fig. 1, a spring 45 being loosely mounted on the plunger 37 above said sleeve and adjustably retained in position by means of a collar 46 and set screw 47. To retract or raise the press head and its assembly, a spring 48 may be loosely mounted on the upper portion of the plunger 37 and adjustably retained in position by a collar 49 and set screw 50. The plunger 37 is slidably mounted in and supported by a sleeve 51, bolted or otherwise adjustably secured to the frame 6, as by means of screws 52a passing through enlarged or slotted openings 52b in a flange 52 and threaded into the frame 6. Shims 52c may be provided so that the press or preforming assembly is adjustable in all directions.

It will be seen from the foregoing description of the preforming assembly that in operation the annular press sleeve or ring 44 will first encounter the rim or outer edge of the mold and prevent the clay or plastic charge from being pressed out over the side of the mold, the spring 45 being adjustable on the plunger to regulate the pressure necessary for the press ring 44 to properly perform its function. The press head 39 and plate 41 continue to descend, spreading the clay radially from its central position toward the brim of the mold, and preform the charge, securely bonding the clay to the mold by pressure, or may place it in final form, and then elevates followed by the press ring, and the charge is then ready for the profile and trimmer or jiggering operation, or it may then be considered in final form. Fig. 1 discloses a means for charging molds with plastic clay, the clay being applied to the central zone of the mold as shown in an amount sufficient to form a piece of ware. It is obvious that the structure of this preforming assembly could be varied without departing from the scope of the invention, the construction illustrated being simply a preferred means for accomplishing the desired operation.

Various means could be adopted to operate the press or preforming means, but I prefer to employ cam devices arranged on a common drive shaft 59, Fig. 2, rotatably mounted in bearings on opposite sides of the frame of the mechanism as at 60, and which will be of such extent as to accommodate the number of units in operation.

To operate the preforming assembly, I prefer to bifurcate the upper extremity of the plunger 37 and mount therein a cam roller 72 on a bearing pin 73, extending through the upper bifurcated extremity of said plunger. This cam roller 72, through the action of the spring 48, continually engages a cam 74, also adjustably mounted on shaft 59 as by a hub 75 and screw 76. The cam 74 is formed of suitable shape and size and has a high part 74a. When the high part 74a engages the roller 72, the press head 39, press ring 44 and press plate 41 will be in their lowermost position on the mold containing the charge of plastic material, to preform the latter. The rising movement of this assembly may be more gradual, the press head 39 and plate 41 first leaving the charge and then the press ring 44. To prevent rotation of the plunger, I prefer to form a longitudinal groove 51a, therein and insert a screw 51b through the sleeve 51 into said groove.

It may be desirable in some instances to form the lower surface of the press plate 41 with grooves or irregularities, particularly in the event the mold is being rotated when the charge is being preformed.

In the present instance I provide a frame, generally indicated at 98, which is slidably or adjustably mounted on supporting rails or members 99, as at 99a, the frame 98 having pivot bearings 100, which rotatably receive spindles 101, the latter terminating in chucks 102, adapted to support or carry the mold while the latter is in position under the preforming assembly. In the present instance an independent motive means as at 103 is provided for rotating the spindles 101 and chucks 102, but these spindles could be rotated uniformly or separately by cams or otherwise if desired. The spindle 101 has a reduced portion or neck 104, which fits into a cross fork 105. A separate cross fork may be provided for each spindle and adjustably connected by nutted bolts 106 and shims 106a, so that the spindles and chucks may be disposed at varying elevations. However, in this instance I show the cross forks adjustably connected and controlled as to vertical movement by the pitman rod 93, which extends through one of the cross forks and is provided with supporting and adjusting nuts above and below the same, as at 107. The pitman 93 extends downwardly through a sleeve 108 and is pivoted as at 109 to one extremity of a lever or bar 110, preferably disposed substantially horizontally and having a cam roller 111 rotatably mounted at its opposite extremity, said lever 110 being adjustably fulcrumed as at 110a. The foregoing structure may be readily understood by referring to my Patent No. 1,757,132.

A main drive shaft 112, extending to a suitable source of power, not shown, is provided in the present instance and may have bearing at opposite sides of the frame of the mechanism. This shaft will obviously be of such length as to accommodate the number of units in service, and in the present instance carries the cams for moving the trays and for raising and lowering the spindle 101 and chuck bearing the molds. For moving the trays to bring the molds to and remove the molds from the vicinity of the press, it is preferred to use a cam 113 at each side of the track, adjustably mounted on the shaft 112 as by a hub 114 and screw 115. Each cam is preferably formed with a track 116. A lever or bar 117 is adjustably pivoted at its lower extremity as at 118 to an adjustable bracket 118a secured by screws 118b to the rail 99 and has a cam roller 119 rotatably mounted thereon and moving in the track 116. The upper extremity of the lever 117 has mounted therein a bearing pin or small trunnion 120, and mounted on this trunnion is an adjustable pawl 121, which rides over the tray trunnions 97 on the backward movement of the lever 117 and drops by gravity a sufficient distance to abut against the projecting trunnion, and when the lever is moved forwardly due to the cam roller moving in the cam track 116, the conveyor will be moved the distance required in accordance with proper adjustments.

A cam 122 is provided in the present instance to operate the pitman 93, this cam being adjustably mounted on the shaft 112 as by a hub 123 and screw 124. This cam may be of any suitable shape and the roller 111 on the lever 110, which is adjustably fulcrumed as at 110a, continually engages said cam, to thereby actuate the pitman 93 when the cam is rotated.

Power may be transmitted from the shaft 112 to the shaft 59 by means of pulleys or sheaves 125 and flexible members or belts 126, and likewise, a flexible member or belt 103a may be provided for the motor 103 and adjustably connected by means of a cone pulley 103b. The motor 127 may be provided with any appropriate rheostat or speed regulating means as at 127a. The shaft 112 may rotatably extend through and have bearing in a supporting bracket 87, which may be formed integral with or be attached to the frame 98. A bracket is shown at both ends of the chuck and spindle mechanism or frame so that the shaft and cam mechanism may be mounted at either end as found convenient or desirable.

During the preforming operation the molds may or may not be rotated, but ordinarily during this phase of the cycle of operations the chuck may be adjusted so as to raise sufficiently to afford a firm support for the mold while the press head, plate and press ring descend, and the motor 103 may be disconnected from the spindle or need not be operated. In case the mold is rotated, it may be desirable to rotate the press ring also to prevent wearing away of the outer edge of the mold and the press ring is adapted to be mounted so as to rotate with the mold if desired.

When the mold with the segregated charge thereon is disposed under the press head, the annular press ring 44 will descend and first contact with the rim of the mold and prevent the charge from being pressed beyond the edge of the mold, and the press head 39 and plate 41 will then descend and preform or press the charge in or on the mold. Some of the advantages of the chamber 42 have been heretofore explained, and this chamber will of course descend and function at this time with the press head 39 and plate 41. As has also been heretofore explained, the chuck and spindle may be raised and lowered or rotated as desired during this preforming operation. The press assembly then rises and the mold with its charge may then be considered as finished or ready for the profile and trimmer or jiggering operation.

Fig. 3 shows a modification in press structure which I prefer to employ in the use of molds such, for instance, as are used in the manufacture of bowls, cups, etc.

To accommodate the press or preforming means to this type of mold, a press ring as at 44a, Fig. 4, may be used and a press head as at 39a having a chamber 42a, which will serve for the introduction and circulation of fluid or other mediums as described in connection with the chamber 42. The side and bottom walls of the press head may be made porous or otherwise as specified in connection with the press plate 41.

The jiggering assembly may be of any suitable type adapted for molds of this form, but I prefer to use a profile and trimmer assembly as disclosed in my reissue application Serial No. 32,753.

In this instance of producing hollow ware, the press head is comparable to a plunger and in effect the action is to press out a blank having an approximation of final ware form which is mechanically bonded to the mold in a manner as to prevent air entrapment and promote efficient capillary action, this step coming between the step of charging the mold and jiggering the clay to finished green stage.

The mold when shifted under the press head and the press then operates to press the charge, engaging the exposed surface thereof and spreading the clay to the desired shape and conforming its lower or mold-contacting surface to the mold contour whilst adhesively bonding it thereto, the charge confining member or ring limiting the radial expansion of the charge. The mold with the formed charge thereon may then be advanced and rotated in operative adjacency to the profile and trimmer to put the finishing touches to the ware and enhance its finish.

I claim:

1. In mechanism of the class specified for molding clay on molds, clay forming means comprising a body having a chamber therein and a clay engaging surface, and means for co-operation with the rim of a mold to limit the radial spread of the clay.

2. In mechanism of the class specified, means for conforming a charge of plastic material to the contour of a mold, comprising a plunger, a press head removably and adjustably applied to said plunger, an annular press ring also removably and adjustably applied to said plunger and slidable over said head, and a press plate removably and adjustably mounted on the lower extremity of the press head and forming a chamber between the said press plate and press head.

3. In mechanism of the class specified, means for preforming a charge of plastic material, comprising a plunger, a press head removably and adjustably applied to said plunger, an annular press ring removably applied over said press head, and a press plate removably and adjustably mounted on the lower extremity of the press head and forming a chamber between the said press plate and press head, the said plunger embodying means for conveying a fluid medium to said chamber.

4. In apparatus for applying plastic clay to jiggering molds and preforming said clay thereon, the combination with a mold and press member, of an annular resiliently mounted charge confining member encompassing and having relative movement with said press member and adapted to co-operate with the mold to limit the radial expansion of a clay charge relatively to the mold surface.

5. In a preforming mechanism for applying clay to jiggering molds made of plaster, a plunger, a chambered preforming press head connected to said plunger operable to spread clay over the molding surface of the jiggering molds and bond the same thereto and means for supporting said molds.

6. A method of applying clay to jiggering molds made of plaster and forming the same to a blank suitable for jiggering which comprises, laying a charge of clay on the surface of the mold in substantially the center of distribution of the molding surface and then squeezing the clay against the mold at a pressure value sufficient to flow the clay without breaking the mold, spreading the clay by this action progressively to at least the brim zone of the molding surface and bonding it thereto, thereby establishing a state of capillarity for the abstraction of moisture from the clay, the clay releasing from said mold when said clay dries.

7. The method of preparing clay bodies for jiggering which comprises applying a charge of clay to a plaster mold, pressing the charge of clay between the mold and a non-rotatable matrix to flow the clay over the ware forming surface of the mold and repelling the clay from the matrix, said clay being bonded to said mold and releasing therefrom when said clay has dried.

8. In a preforming press for applying charges of plastic material to plaster pottery ware molds, a plunger and a chambered press head connected thereto together with a mold support and means for causing relative movement between said plunger and said mold support.

9. In mechanism of the class specified, preforming and conforming means comprising a plunger having an enlarged head with a chamber therein, and means slidable on the head for co-operating with the rim of a mold to confine a charge of plastic material.

10. In mechanism of the class specified, means for cooperating with a mold to preform a charge of plastic material, comprising a plunger having an enlarged press head, and a press plate removably and adjustably applied to the bottom portion of said head.

11. A method of coating the forming surface of a plaster jiggering mold with clay to form a jiggering bat which comprises, extruding a quantity of clay through an orifice, segregating a charge of clay therefrom said charge being deposited upon the molding surface of a mold, said charge covering only a portion of said surface but containing a sufficient volume of plastic material to cover the entire molding surface when spread out and then spreading out the material as aforesaid by applying pressure thereto axially of the mold with a non-adhesive die thereby adhesively bonding the material to the molding surface and commencing the capillary abstraction of fluid from the material, the bond thus created between the mold and clay being maintained when pressure is released by withdrawal of said die from the plastic material.

12. A method of coating the surface of a plaster jiggering mold with plastic material preparatory to jiggering which comprises, applying a body of plastic material to the center of distribution of a molding surface of a mold and then spreading out the material by applying pressure thereto axially of the mold thereby adhesively bonding the material to the molding surface and commencing the capillary abstraction of fluid from the material and maintaining the bond thus created by applying fluid to the surface of the material opposite that bonded to the mold.

13. In mechanism of the class specified, means for preforming a charge of plastic material, comprising a plunger and a chambered press head connected to said plunger.

14. In the mechanism of the class specified, the combination with a rotating mold and press member, of an annular rotatable charge-confining member adapted to cooperate with the mold to limit the radial expansion of a charge of plastic material.

15. In a pottery press for forming jiggering bats on absorbent plaster molds, the combination which comprises, a preformer, a mold support, a mold removably disposed in said support, means for relatively moving said preformer and said mold support to cooperate the mold and the preformer to thereby progressively spread clay over the forming surface of the mold and adhesively bond the clay thereto and means engageable with the mold incident to cooperation with the preformer for exerting a yieldable pressure thereon in the brim zone of the mold during the spreading operation.

16. In a machine for preforming charges of clay preparatory to jiggering, the combination of a plaster jiggering mold and a non-rotatable former operable to squeeze the charge of clay and progressively spread the same over the molding surface of the mold, a mold lifter in which said mold is removably disposed and means comprising a transfer member having an open seat in which the mold is disposed for transporting the mold to and from the said support.

17. In apparatus for preforming charges of clay preparatory to jiggering, the combination which comprises, a mold carrier having an open seat in which a mold is disposed, a preforming die, a mold lifter arranged in registration with said die, means for intermittently moving said mold carrier to bring the mold into registration with the mold lifter, a support for said die, a cam for reciprocating said die support and die and means for raising said mold lifter to raise the mold from said carrier, said die having a molding surface substantially co-extensive with the molding surface of the mold and being adapted to press and progressively spread clay over the forming surface of the mold, and means for rendering said die non-adhesive to clay.

WILLIAM J. MILLER.